(12) United States Patent
Gamucci et al.

(10) Patent No.: US 11,707,102 B2
(45) Date of Patent: Jul. 25, 2023

(54) BODY PROTECTION DEVICES, PARTICULARLY PROTECTIVE HELMETS

(71) Applicant: FONDAZIONE ISTITUTO ITALIANO DI TECNOLOGIA, Genoa (IT)

(72) Inventors: Andrea Gamucci, San Miniato (IT); Vittorio Pellegrini, Gragnano (IT); Francesco Bonaccorso, Genoa (IT)

(73) Assignee: FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 1113 days.

(21) Appl. No.: 16/340,858

(22) PCT Filed: Oct. 10, 2017

(86) PCT No.: PCT/IB2017/056241
§ 371 (c)(1),
(2) Date: Apr. 10, 2019

(87) PCT Pub. No.: WO2018/069824
PCT Pub. Date: Apr. 19, 2018

(65) Prior Publication Data
US 2019/0239589 A1 Aug. 8, 2019

(30) Foreign Application Priority Data

Oct. 10, 2016 (IT) .......................... 102016000101327

(51) Int. Cl.
*C09D 133/12* (2006.01)
*A42B 3/06* (2006.01)
(Continued)

(52) U.S. Cl.
CPC .............. *A42B 3/061* (2013.01); *A42B 3/063* (2013.01); *A42C 2/00* (2013.01); *C08J 7/0427* (2020.01); *C08K 3/042* (2017.05); *C08K 3/22* (2013.01); *C08K 7/02* (2013.01); *C09D 7/61* (2018.01); *C09D 133/12* (2013.01); *C09D 163/00* (2013.01); *C08J 2433/12* (2013.01); *C08K 2003/2241* (2013.01)

(58) Field of Classification Search
CPC ................. C08J 2433/12; C08J 7/0427; C08K 2003/2241; C08K 3/042; C08K 3/22; C08K 7/02; C09D 133/12; C09D 163/00; C09D 7/61
See application file for complete search history.

(56) References Cited

U.S. PATENT DOCUMENTS 3,946,441 A    3/1976  Johnson
8,850,612 B1*  10/2014 Perciballi .................. F41H 1/04
                                                    2/2.5

FOREIGN PATENT DOCUMENTS

WO          2014186452 A1     11/2014

* cited by examiner

*Primary Examiner* — Callie E Shosho
*Assistant Examiner* — Krupa Shukla
(74) *Attorney, Agent, or Firm* — Tarter Krinsky & Drogin LLP

(57) ABSTRACT

Body protection devices, particularly protective helmets are provided, which comprise a shell of plastic material or of fiber-reinforced plastic material, wherein the shell comprises an outer coating layer formed of a polyacrylic or polyepoxide polymeric matrix including graphene fillers. Processes for the production of body protection devices are also provided.

9 Claims, 6 Drawing Sheets

(51) Int. Cl.
*C09D 163/00* (2006.01)
*C08K 3/04* (2006.01)
*C09D 7/61* (2018.01)
*C08K 3/22* (2006.01)
*C08J 7/04* (2020.01)
*C08K 7/02* (2006.01)
*A42C 2/00* (2006.01)

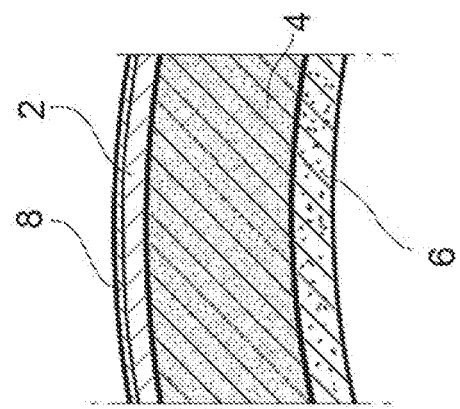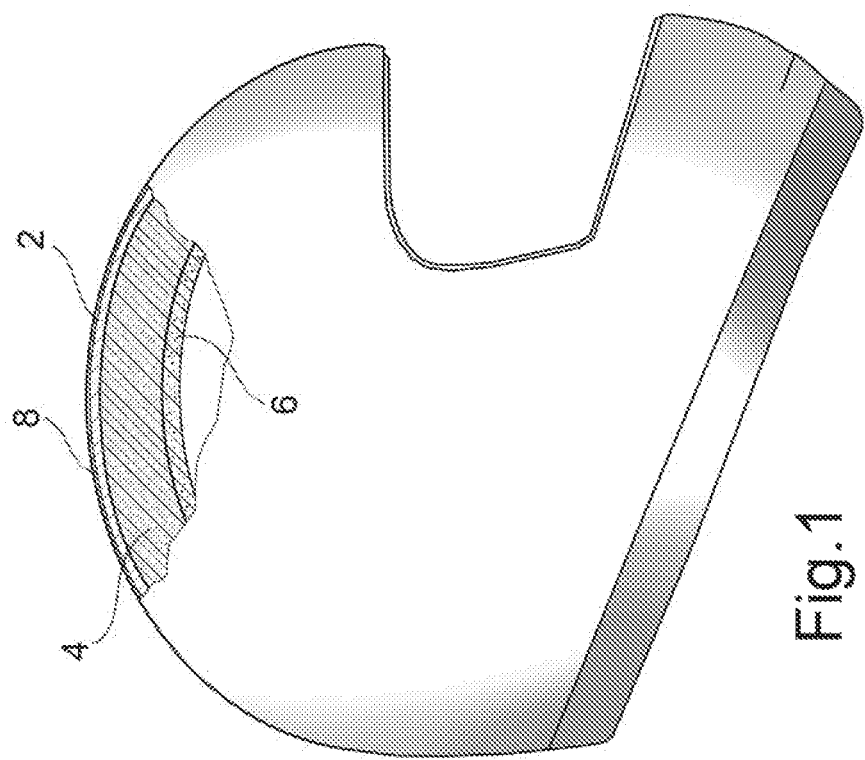

BODY PROTECTION DEVICES, PARTICULARLY PROTECTIVE HELMETS

CROSS-REFERENCE TO RELATED APPLICATIONS

This application is a National Phase Application of PCT International Application No. PCT/IB2017/056241, International Filing Date, Oct. 10, 2017, claiming priority to Italian Patent Application No. 102016000101327, filed Oct. 10, 2016, each of which is hereby incorporated by reference in its entirety.

FIELD OF THE INVENTION

The present invention generally refers to the production of a body protection device and in particular to a protective helmet of the type used to drive motor vehicles, in carrying out sporting activities or for work safety.

BACKGROUND OF THE INVENTION

The need to make a helmet that meets the ever-tighter safety regulations in different countries is without a doubt a critical issue for manufacturers. Helmets must be used by motorcyclists and workers, particularly in the construction sector. A protective helmet must meet two contrasting requirements: on the one hand, it must provide adequate shock protection and high energy absorption, and on the other, it must be comfortable to wear in different climatic conditions. Cranial trauma is one of the most frequent motorcycle accident injuries, accounting for approximately 67% of all injuries.

The performance of a protective helmet is expressed in terms of its ability to protect the user from trauma in the event of an impact or accident, reducing the cranial impact and minimizing injury. This condition is regulated in some countries by regulations issued by national authorities, such as the European Standard UN/ECE Regulation No. 22; in other countries, it is regulated by private organizations. Despite some differences between the standards adopted, what all these regulations have in common is the fact that the helmet must have the ability to absorb energy as a result of impact to prevent brain damage. In addition, structural design features have an influence on mechanical response. In fact, the thickness is closely related to a lower linear acceleration transmitted to the head. However, thicker helmets are also heavier and therefore have the disadvantage of generating more load on the cervical column. Therefore, comfort is an important parameter that must be considered.

A problem associated with the helmets available in the current state of the art concerns the discomfort experienced by the user in high ambient temperature conditions (i.e. under direct solar radiation). In this case, helmets according to the state of the art show poor thermal conductivity, in that the low thermal dissipation to the outside causes a high local inner temperature experienced by the user. Conventional motorcycle helmets comprise at least a rigid plastic shell or a fiber-reinforced plastic shell. On the outer surface of such shell is generally applied a thin protective layer of a polymer-based paint having a decorative function or possibly having abrasion resistance and chemical resistance properties.

For example, U.S. Pat. No. 3,946,441 describes a protective helmet for motorcyclists which, in this case, has two overlapping shells: a first inner polycarbonate shell and a second outer shell of fiber-reinforced plastic, such as fiberglass. The outer surface of the second fiber-reinforced plastic shell is coated with a polyurethane paint film having a decorative function and also which is useful to prevent the "gel coat" that tends to form on the surface of a fiberglass shell from being subject to breaking or crushing in case of impact.

SUMMARY OF THE INVENTION

The object of the present invention is to provide an improvement, applicable to helmets and to conventional protection devices in general which have a plastic or fiber-reinforced plastic shell, which simultaneously improves impact resistance and dissipation of heat.

Another aim of the invention is to increase impact resistance and heat dissipation with a solution that does not substantially affect the structural features of a helmet and is therefore directly applicable to conventional structures currently available.

In view of such aims, the object of the present invention is a body protection device, and in particular a protective safety helmet, having the features described and claimed herein.

Another object of the present invention is the use of an epoxy- or acrylic-based paint or coating composition, including graphene fillers for the production of a film or coating layer on the outside of a shell of a body protection device made of plastic material or fiber-reinforced plastic material.

Another object of the invention is a process for the production of a protection device using said coating composition in replacement of, but also in addition to, the conventional protective films currently used.

Further advantages and features of the present invention will become apparent from the detailed description that follows, provided by way of non-limiting examples, with reference to the drawings.

BRIEF DESCRIPTION OF THE FIGURES

FIG. 1 is a partially sectioned side view of a protective helmet;

FIG. 2 is a sectional view of a portion of the helmet of FIG. 1;

DETAILED DESCRIPTION

Figure 3:
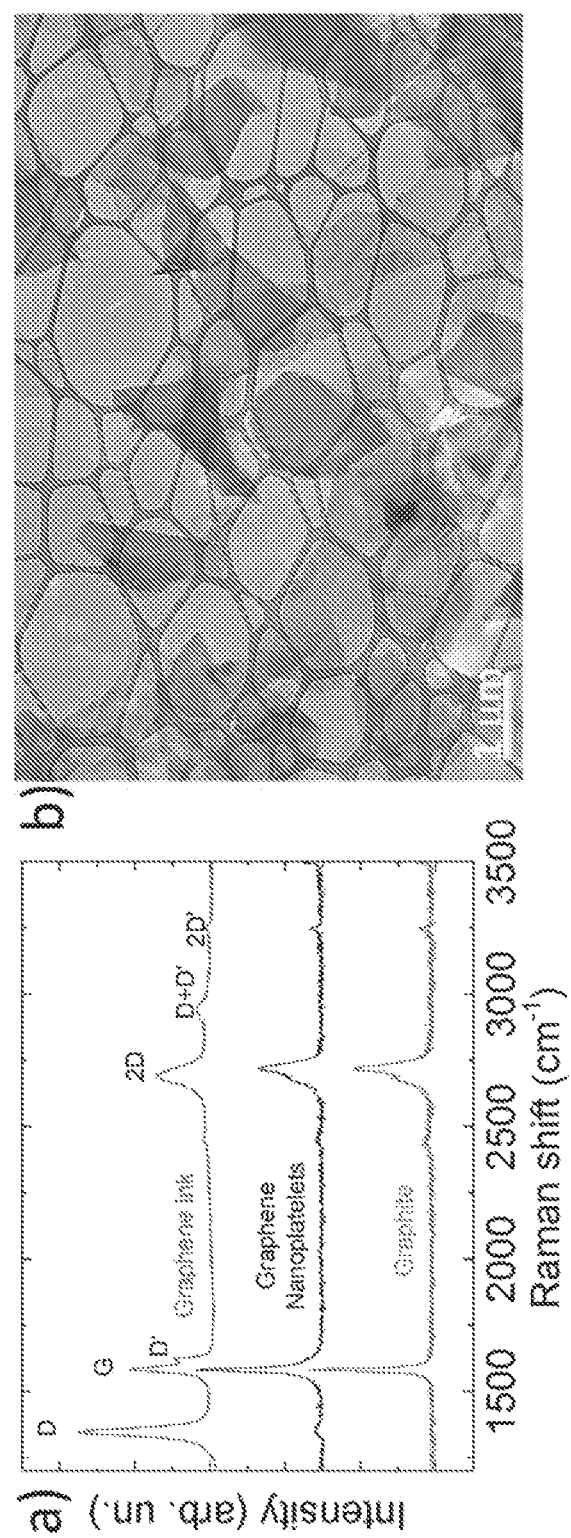
FIG. 3a is a Raman spectrum of graphite, graphene nano-platelets and graphene ink.
FIG. 3b is a representative TEM image of graphene flakes contained in an ink.

The invention generally applies to body protection devices, of the type comprising at least one plastic or fiber-reinforced plastic shell. Such devices comprise, for example, protective guards for body parts such as the knee, shin or back, used in particular in the exercise of sports activities.

However, the preferred form of implementation relates to a protective helmet, for example, for driving motor vehicles or for sports activities such as mountaineering, skiing, American football, or a helmet for work safety.

FIG. 1 shows an example of a motorcycle helmet comprising a shock-resistant shell 2 made of plastic or fiber-reinforced plastic material, an inner coating layer 4 made of expanded elastomeric plastic material, with shock absorption function and a padding layer 6.

Clearly, the structure and inner layers of the helmet are purely illustrative and non-binding for the purposes of the present invention, provided that at least one shock-resistant shell of type 2 is present. Within the scope of the invention is a helmet having a further type 2 shell inside the first one, for example as described in the aforementioned U.S. Pat. No. 3,946,441, and a helmet devoid of an internal expanded foam coating.

In particular, the outer shell 2 may be polyacrylonitrile butadiene styrene (ABS) or in particular fiberglass with glass and carbon fiber.

According to the invention, the impact-resistant plastic shell is coated with an outer layer 8 formed by a polymeric matrix of polyacrylic or polyepoxide resin including a graphene flake filler.

With respect to impact resistance, the coating layer used according to the invention provides an improvement in the mechanical properties which reduces, on average, by about 10% the absorbed energy during the impact simulation test (crash test), with respect to conventional helmets with a fiberglass shell and plastic material coated with a conventional paint, such as polyurethane.

With respect to thermal conductivity, the coating layer is able to improve heat dissipation and thermal regulation by up to 50%. In effect, the rate of temperature decrease is faster by about 50% compared to helmets with a traditional coating.

The aforementioned coating layer is obtained by the application, by means of conventional techniques, of a hardening liquid composition comprising a polymeric paint, graphene fillers and optionally a diluent.

a) Polymeric Paint

The polymeric paint used in the coating liquid composition preferably comprises a bicomponent-type polyacrylic or polyepoxide resin, i.e. one able to solidify following the addition of a hardening agent.

Polyacrylic or polyepoxide paints available on the market may be used, appropriately with graphene filler additives and optionally a diluent.

In the preferred case of polyacrylic resin, the polymeric paint may, for example, comprise the following components:

| Component name | Percent concentration by weight |
| --- | --- |
| Polymethylmethacrylate | 20-30% |
| Methyl methacrylate | 0.1-1% |
| Xylene | 5-10% |
| Low boiling naphtha | 1-3% |
| Trimethoxysilyl propanetriol | 0.1-1% |
| Titanium dioxide | 12-15% |
| 2-methoxy-1-methylethylacetate | 5-10% |
| N-butyl acetate | 10-12% |
| Inert fillers | q.s. to 100% |

The inert components may comprise talc, calcium carbonate, mica, aluminates and any pigments, for example in a concentration of 10 to 30% by weight.

As epoxy-type paint, commercially available conventional paints may be used.

Polyepoxide paint is, for example, a paint comprising (percentage by weight):

| | |
| --- | --- |
| epoxide resin from bisphenol A, bisphenol F and epichloridine (50-80% dry residue) in reactive diluent | 25-35% |
| glycol ethers (e.g. 1-methoxy-2-propanol) or glycol ether acetate (1-methoxy-2-propanol acetate) | 3-5% |
| xylene | 5-10% |
| inert fillers (e.g. talc, quartz, calcium carbonate, barites, silicas and mixtures thereof) | q.s. to 100 (e.g. 30-45%) |
| additives (thickeners, pigments, plasticizers and their blends) | up to 15%. |

Polymeric paint is the predominant part of the fluid coating composition that contributes to bonding all the components. As indicated, it comprises thermosetting polymers which solidify through chemical reactions wherein the polymer chains bind to each other by covalent cross-linking.

The paint adheres to the substrate whereon it is deposited and becomes solid after evaporation of the solvents. The solvents contained are necessary to maintain the resin in the fluid state and to allow its application as a coating layer. The aforementioned solvents may naturally be replaced by other components, preferably so that the paint solidifies at room temperature after mixing with a suitable hardening agent. Following solidification, the paint absorbs and incorporates all the other components (described below) by providing the polymer substrate to which the rigidity, impact strength and thermal dissipation properties desired for the purpose of the invention are applied.

b) Hardening Agent

The hardening agent for a polyacrylic paint typically comprises a polyisocyanate.

In the case of polyacrylic paint, by way of example, the hardening agent may comprise:

| Component name | Percent concentration by weight |
| --- | --- |
| Polyisocyanate (HDI derivative) | 30-50% |
| Xylene | 25-30% |
| Ethylbenzene | 1-5% |
| Hexamethylene diisocyanate (HDI) | 0.1 to 0.5% |
| N-butyl acetate | 25-30% |
| 2-methoxy-1-methylethylacetate | 5-10% |

The role of the hardening agent as a result of its mixing with the paint is to cause a rapid solidification in order to ensure an adequate industrial process speed in the application of the coating.

The hardening agent chemically reacts exothermically with the paint. The presence of functional monomers allows the cross-linking and reticulation of the paint and rapid drying by absorbing units very quickly and thus converting the paint into a solid and gummy substance. The hardening of the paint must be finalized after deposition on the substrate.

In the case of polyepoxide paint resin, the hardening agent is typically an amine compound known per se for this application; for example, the above-mentioned two-component polyepoxide paint requires a hardening agent comprising (percentage by weight):

| | |
|---|---|
| polyamine (aliphatic or cycloaliphatic or aromatic) or polyamide | 85-90% |
| xylene | 5-7% |
| alcohols (e.g. isobutyl alcohol) or glycol ether/glycol ethers | 5-7%. | c) Graphene Filler

Graphene is a two-dimensional crystal characterized by exceptional properties in terms of mechanical strength, thermal and electrical conductivity, transparency and flexibility. For the purposes of the invention, thermal and mechanical properties are of particular importance. In effect, graphene is by far the best thermal conductor existing in nature and the most durable material.

In order to exploit the aforementioned properties, the production of large amounts of graphene and of the appropriate quality is required. Large volumes of graphene flakes with the desired morphology (lateral dimension and thickness) may be produced by means of liquid phase exfoliation of graphite with technologies known per se such as wet jet milling in suitable solvents. Other exfoliation methods include ultrasonication, ball milling and/or shear mixing. Within the scope of the invention, graphene produced in liquid solutions (called graphene inks) or a graphene powder obtained from such inks is used.

A typical graphene-based ink consists of 1 g of graphene flakes (or scale) dispersed in a liter of solvent; naturally, other concentrations may also be used. The solvents used for the exfoliation and dispersion process may, for example, be N-methyl-2-pyrrolidone or a mixture of ethanol and water, although the solvents are not limited to those cited hereinbefore. The graphene flakes dispersed in the ink preferably have a thickness of less than eight layers for 80% of the total, as shown by the Raman spectrum in FIG. 3a, and have a lateral dimension preferably in the range from 0.1 to 5 μm; see the representative, Transmission Electron Microscopy (TEM) image shown in FIG. 3b.

Figure 4:
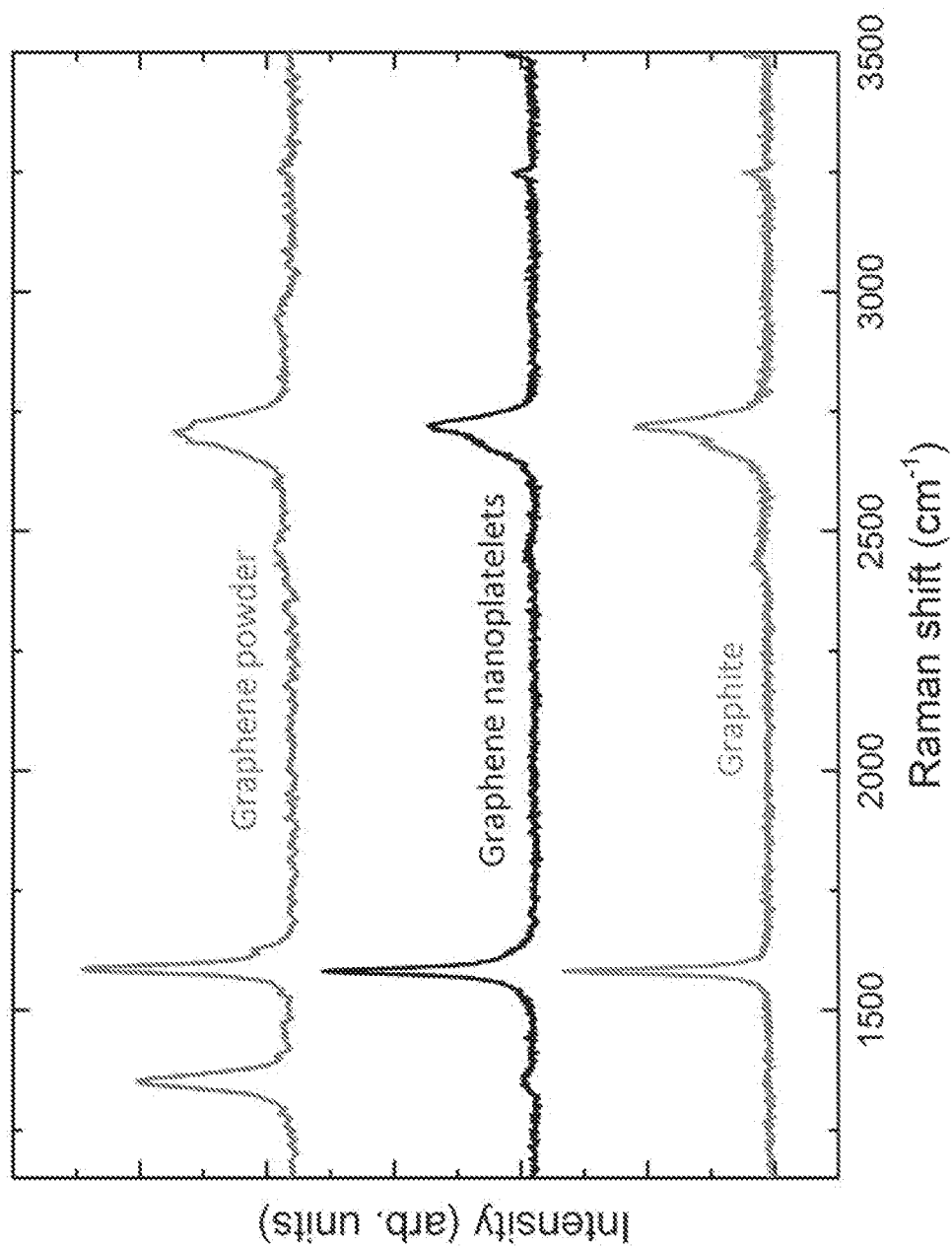
FIG. 4 is a Raman spectrum of graphite, graphene nano-platelets and graphene powder.

Graphene powders may be extracted from the inks by means of a lyophilization process that prevents the phenomenon of restacking of graphene flakes following evaporation of the solvent. However, other thermal processes may be used to prevent the phenomenon of restacking of graphene flakes as a result of evaporation. The result obtained is an extremely volatile powder which maintains the morphological features of the ink flakes in terms of the lateral dimension of the flakes thus obtained (see FIG. 3b) and also in terms of thickness. From the Raman characterization in FIGS. 3 and 4, no aggregation appears; in effect, the Raman spectrum of graphene powder differs distinctly from that of the initial graphite and thus from that of commercial graphene nanoplatelets.

In the liquid coating composition, the concentration of graphene fillers may be between 0.05 and 1% by weight, based on the total weight of the composition.

In the coating layer obtained on the substrate of plastic material, following the evaporation of the solvents, the concentration of graphene is on the order of 0.1 to 2% by weight, based on the total weight of the solidified composition.

d) Diluent

The liquid coating composition may optionally include an organic diluent in such a quantity as to obtain a liquid composition with a viscosity (prior to hardening) suitable for conventional applications.

Preferably, in the case of acrylic paint, the diluent is a solution comprising xylene and/or acetone.

In the case of polyepoxide paint a diluent may be used, comprising:

| | |
|---|---|
| xylene | 40-60% by weight |
| glycol ether/glycol ether acetate | 40-60% by weight |

By way of example, the diluent may comprise the following components:

| Component name | Percent concentration by weight |
|---|---|
| Xylene | 30-50% |
| Acetone | 20-40% |
| N-butyl acetate | 10-20% |
| 1-methoxy-2-propyl acetate | 5-10% |
| Ethylbenzene | 5-10% |
| Isopropanol | 0.1 to 10% |

For the purposes of the invention, graphene flakes, in the form of powders or liquid ink, are added to the diluent. If a powder is used, the concentration of graphene in the diluent varies from 0.1 g to 10 g per liter of diluent, although the concentrations are not limited to those cited hereinbefore; in the case of the use of a graphene ink, the dispersion in its solvent (ethanol or ethanol/water mixture) has a similar concentration per liter of solvent. To achieve a good dispersion of the graphene in the diluent, an agitation and shaking operation is required; manual mixing or a short ultrasonication of the solution is sufficient to obtain a homogeneous dispersion of the powder or ink in its diluent.

The deposition techniques of the liquid coating composition include conventional techniques such as spray coating, dip coating and brush applications.

As already indicated, the plastic shell to which the coating is applied is preferably a fiber-reinforced plastic shell, preferably reinforced with glass or carbon fibers, however other plastic materials may be coated, achieving advantages in terms of mechanical properties and of heat dissipation inherent in the invention.

Example of Implementation

The liquid coating composition of the above described type was deposited on the outer surface of a fiberglass shell of a protective helmet for motorcyclists by means of spray application. The composition used included the following components:

- 1 kg of polyacrylic paint with composition falling within the above values
- 200 g of hardening agent with composition falling within the above values
- 200 g of diluent with composition and concentration corresponding to those cited above
- 2 g of graphene powder having the following characteristics:
- side dimension of exfoliated graphene flakes between 100 nm and 10 μm, with a number of layers less than 8 for at least 90% of flakes comprising the powder.

The graphene powder is initially added to the diluent and mixed with the diluent by mechanical agitation, for example using a spatula. The components are then loaded into a paint gun.

Two deposition stages on the fiberglass shell were made, obtaining, after drying for a few minutes, a coating layer having a thickness in the range of 0.05 μm to 0.5 μm, although the thicknesses are not limited to those cited hereinbefore.

Comparative Tests

Thermal Dissipation Test

Thermal dissipation measures were made using a FLIR A655sc Thermal Camera after illuminating the shells with a halogen lamp at an initial temperature of about 50° C.

The temperature value achieved after the illuminating process and its time-dependent decrease was measured quantitatively considering the central core of the warmest heated area after irradiation with the lamp. The time-dependent temperature decrease was quantitatively measured with the thermal camera by continuous visualization of the helmet during its cooling to room temperature.

Figure 5:
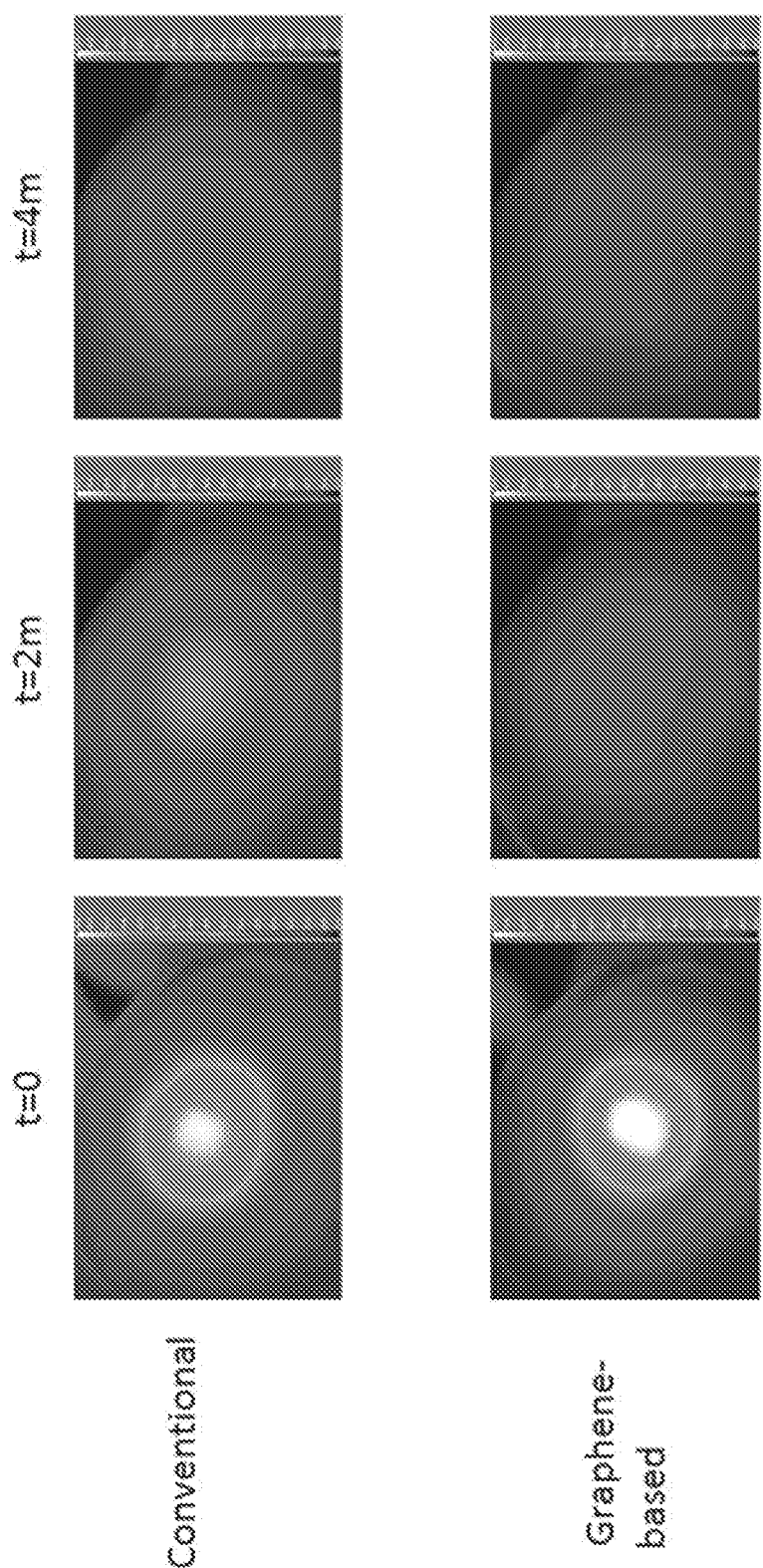
FIG. 5, referring to thermal dissipation tests, shows six screens comparing the heat dissipation of shells of a helmet treated with conventional paint (upper panels) and a graphene-based coating composition used in the scope of the invention (lower panels)

Test screens are shown in FIG. 5.

As can be seen from FIG. 5, the decrease in temperature on the helmet provided with a graphene coating layer is significantly greater than that of a conventional helmet which in this case had an outer coating of equal thickness consisting of a two-component paint diluted with polyurethane diluent.

Figure 6:
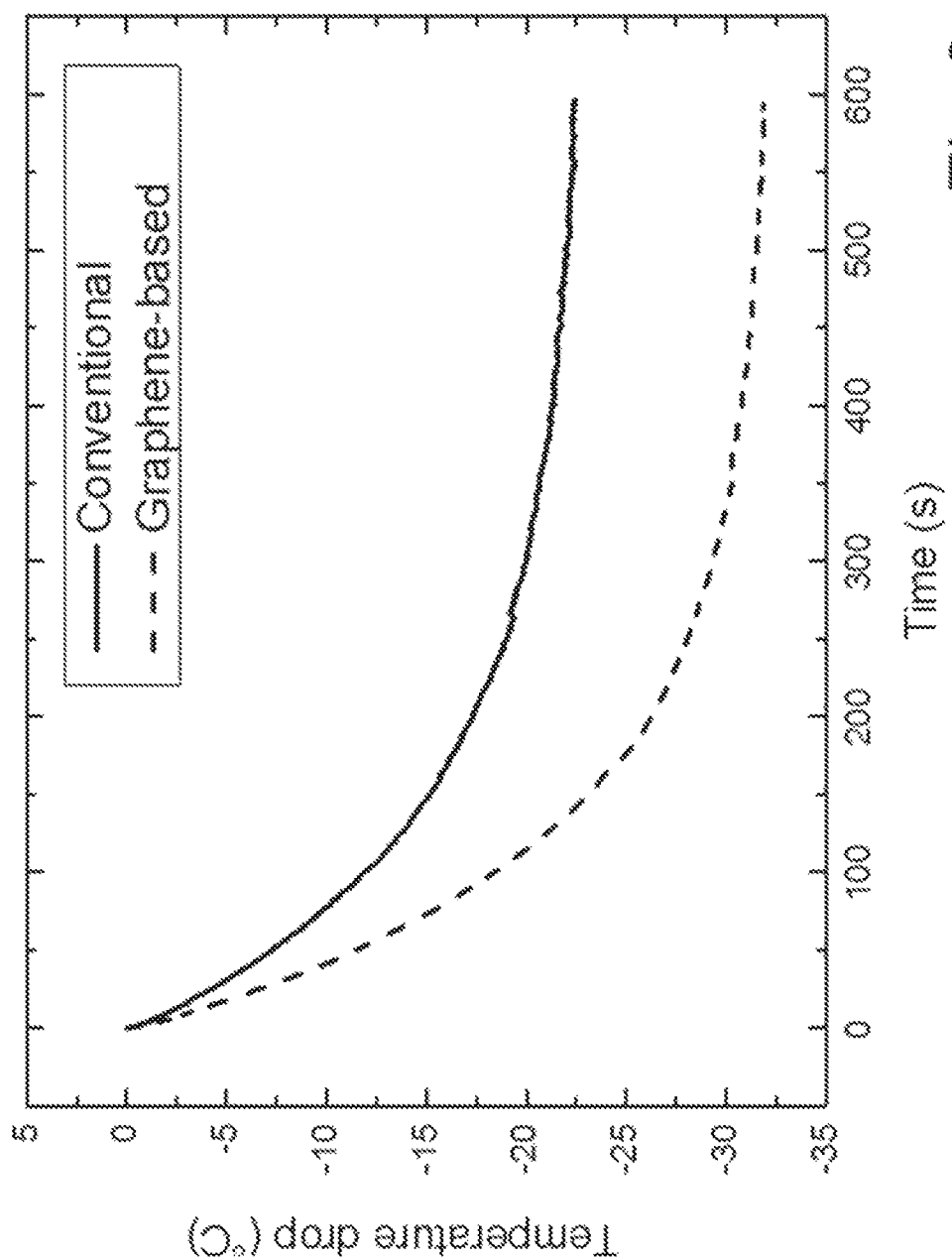
FIG. 6 is a plot of the time-dependent temperature reduction for shells of a helmet treated with a conventional paint and with the graphene-based coating composition used in the scope of the invention.

In effect, the temperature of the hottest point at the center of the illuminated region decays exponentially with a time constant that is significantly lower than that of the conventional case; see FIG. 6, wherein the time-dependent temperature decrease during the cooling of the helmet at room temperature is diagrammed.

Impact Resistance Tests

Although there are different standards, all existing standards must follow the same principles as to the assessment of helmet effectiveness in the case of an accident. Therefore, the helmet must be able to:

absorb sufficient energy during impact;
stay on the head during the accident;
resist penetration of pointed objects.

European motorcyclists must by law wear a helmet that meets the requirements of the ECE Regulation 22.05. The critical parameters analyzed under this Regulation during the type-approval tests are Peak Linear Acceleration (PLA) and the Head Injury Criterion (HIC). The PLA measures the maximum acceleration value at the center of gravity of the cranial form during simulated impact test. Usually the PLA value is given as a number multiplied by the gravitational acceleration constant g. The main limitation of this parameter is the fact that it ignores the duration of the impact. However, the latter is taken into account by the HIC criterion. The HIC parameter takes into account the most damaging part of the acceleration pulse finding the maximum value of the same function $$HIC = \left(\left[\frac{1}{t_2-t_1}\int_{t_1}^{t_2} a(t)\,dt\right]^{2.5}(t_2-t_1)\right)_{max}$$

wherein a(t) is the acceleration of the head expressed in g, $t_2-t_1$ is the time interval defining the total duration of the impact and $t_1$ and $t_2$ are any two points of the acceleration impulse in time, expressed in seconds.

The type-approval tests are carried out on the complete helmets, i.e. on the fiberglass shell and the liner and the retention system in two different configurations. The first is called "flat", which simulates impact on the asphalt, while the second "kerbstone", simulating the impact on the sidewalk. The helmet speed at the impact point must be 7.5 m s$^{-1}$ and the values obtained for the PLA and HIC parameters must remain below 275 g and 2400 respectively. The tests were performed on five different points of the helmets defined as front (B), rear (R), top (P), left side (XS) and right side (XD).

Before testing, the helmets were kept for 5 hours at two different temperatures, i.e. at more than 50° C. and −20° C.

Figure 7:
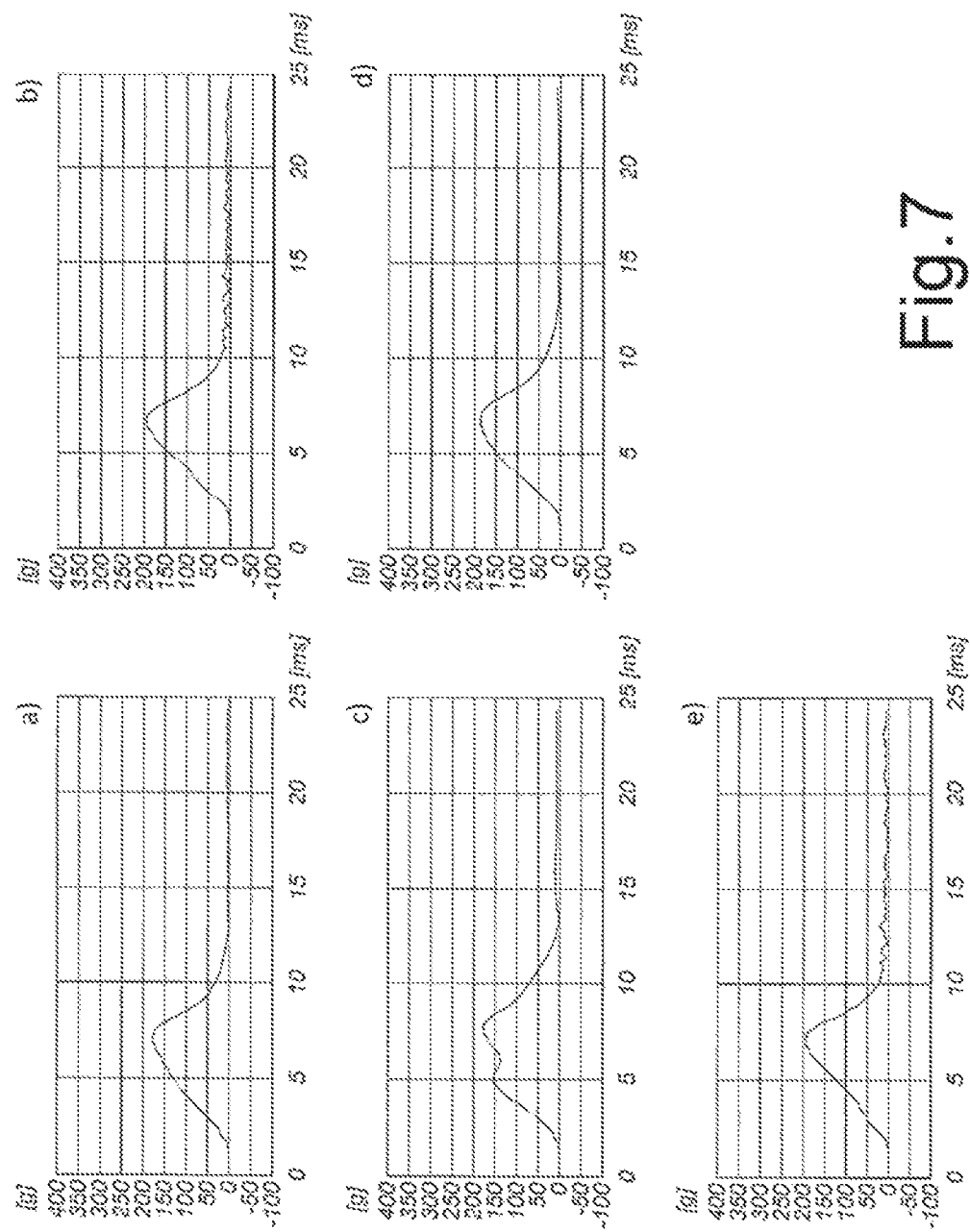
FIG. 7 shows the test curves simulating the impact on a flat surface; in particular type-approval testing according to ECE Regulation 22.05 for complete helmets on five different points a) B, b) XD, c) P, d)R, e) XS.

FIG. 7 shows the impact simulation diagrams on "flat" surface. On an average of ten different tests, helmets containing graphene-based filler showed a 10% reduction in both PLA and HIC values compared to standard helmets.

The invention claimed is:

1. A body protection device comprising a shell of a plastic material or of a fiber-reinforced plastic material, wherein said shell comprises an outer coating layer formed by a polyacrylic polymeric matrix including graphene fillers;
wherein said outer coating layer is obtained by applying to an outer surface of the shell a liquid coating composition comprising a polymeric paint comprising: a polyacrylic paint, a hardening agent for said polymeric paint, graphene fillers and optionally a diluent;
wherein said polyacrylic paint comprises in percentages by weight:
20-30% Polymethylmethacrylate;
0.1-1% Methyl methacrylate;
5-10% Xylene;
1-3% Low boiling naphtha;
0.1-1% Trimethoxysilyl propanetriol;
12-15% Titanium dioxide;
5-10% 2-methoxy-1-methylethylacetate;
10-12% N-butyl acetate; and
q.s. to 100% Inert fillers.

2. The body protection device of claim 1, wherein said polymeric paint is said polyacrylic paint comprising said hardening agent comprising in percentages by weight:
30-50% Polyisocyanate;
25-30% Xylene;
1-5% Ethylbenzene;
0.1-0.5% Hexamethylene diisocyanate (HDI);
25-30% N-butyl acetate; and
5-10% 2-methoxy-1-methylethylacetate.

3. The body protection device of claim 1, wherein said polymeric paint comprises said diluent comprising acetone or xylene.

4. The body protection device of claim 1, wherein said graphene fillers are in the form of a powder obtained by lyophilization of a graphene ink, wherein said graphene ink comprises graphene flakes obtained by exfoliation in the liquid phase of graphite, dispersed in a solvent.

5. The body protection device of claim 4, wherein said graphene ink comprises graphene flakes with side dimensions from 0.1 to 5 μm, and with a thickness of less than eight layers for at least 80% of the totality.

6. The body protection device of claim 1, wherein said liquid coating composition comprises said graphene fillers in the form of a graphene ink comprising graphene flakes obtained by exfoliation in the liquid phase of graphite, dispersed in a solvent.

7. The body protection device of claim 1, wherein said liquid coating composition comprises said graphene fillers in concentration from 0.05 to 1% by weight based on the total weight of the liquid coating composition.

8. The body protection device of claim 1, wherein said outer coating layer comprises a concentration of said graphene fillers from 0.1 to 2% by weight based on the weight of the liquid coating composition forming said outer coating layer after said outer coating layer is solidified.

9. The body protection device of claim 1, wherein said shell is formed from said fiber-reinforced plastic material.

* * * * *